(12) United States Patent
Nguyen

(10) Patent No.: US 8,602,714 B2
(45) Date of Patent: Dec. 10, 2013

(54) STRUCTURAL PROFILE ROTATOR

(76) Inventor: Thanh Nguyen, Anaheim, CA (US)

( * ) Notice: Subject to any disclaimer, the term of this patent is extended or adjusted under 35 U.S.C. 154(b) by 39 days.

(21) Appl. No.: 13/340,676

(22) Filed: Dec. 30, 2011

(65) Prior Publication Data

US 2012/0177475 A1 Jul. 12, 2012

Related U.S. Application Data

(60) Provisional application No. 61/432,165, filed on Jan. 12, 2011.

(51) Int. Cl.
*B21C 47/24* (2006.01)
*B65G 7/08* (2006.01)
*B21B 39/32* (2006.01)

(52) U.S. Cl.
USPC ........... 414/777; 414/754; 414/758; 414/759; 414/772; 264/24; 264/27; 264/32

(58) Field of Classification Search
USPC ................. 414/754, 758, 759, 772, 777, 780
See application file for complete search history.

(56) References Cited

U.S. PATENT DOCUMENTS

| | | | | |
|---|---|---|---|---|
| 2,940,613 A * | 6/1960 | Prentice et al. | ................ | 414/783 |
| 3,021,018 A * | 2/1962 | Paxson | ......................... | 414/754 |
| 3,236,396 A * | 2/1966 | Goodberlet | ................... | 414/754 |
| 3,319,804 A * | 5/1967 | Beatty et al. | .................. | 414/759 |
| 3,780,882 A * | 12/1973 | Wagner | ......................... | 414/759 |
| 6,149,376 A * | 11/2000 | Peting | ......................... | 414/746.3 |
| 6,375,178 B1 * | 4/2002 | Schilb et al. | .................... | 269/71 |
| 6,779,787 B2 * | 8/2004 | Gryder et al. | ................... | 269/71 |
| 7,985,044 B2 * | 7/2011 | Tamura | ......................... | 414/771 |
| 2006/0180434 A1 * | 8/2006 | Arnold et al. | ............... | 198/463.3 |
| 2010/0196133 A1 * | 8/2010 | Pass et al. | ..................... | 414/759 |

* cited by examiner

*Primary Examiner* — Gregory Adams
*Assistant Examiner* — Lynn Schwenning
(74) *Attorney, Agent, or Firm* — Kafantaris Law Offices; Theo Kafantaris

(57) ABSTRACT

An apparatus is disclosed for rotating a structural profile quickly and easily on a single spindle drill line without the use of a crane. The apparatus has two arms which can lay flat or create any angle less than 180 degrees between the two. The apparatus can move horizontally along the drill line and can lift the structural profile vertically for movement and during rotation. This will allow a drill machine operator to rotate large and heavy structural profiles on a drill line and position them with the datum blocks in order to drill the different sides without the need for an overhead crane or other lifting device and without any additional labor to assist with manual flipping and positioning.

15 Claims, 10 Drawing Sheets

STRUCTURAL PROFILE ROTATOR

CROSS-REFERENCE TO RELATED APPLICATIONS

This application claims the benefit of U.S. Provisional Patent Application No. 61/432,165, filed on Jan. 12, 2011, and incorporated herein by reference.

STATEMENT REGARDING FEDERALLY SPONSORED RESEARCH AND DEVELOPMENT

Not Applicable.

FIELD OF THE INVENTION

This invention relates generally to rotating structural components, and more particularly, to an apparatus capable of quickly rotating and moving structural profiles on a single spindle beam drill line.

DISCUSSION OF RELATED ART

A structural profile is a structural component used in constructing industrial buildings and other structures. Structural profiles consist of beams, angles, channels, square tubing, rectangular tubing, round tubing, T-sections, flat bars, and irregular shapes. Common materials used to create structural profiles comprise steel, reinforced concrete, wood, or other suitable metal alloys.

In order to utilize structural profiles in an industrial structure, drill holes or mill slots must be created to connect them to other structural elements. A computer numerically controlled (CNC) beam drill line is an indispensable way to quickly and easily drill holes and mill slots into beams, channels, and other structural profiles. CNC beam drill lines are typically equipped with feed conveyors and position sensors to move the element into position for drilling, as well as probing capability to determine the precise location where the hole or slot is to be cut.

A structural profile is typically rotated on a single spindle drill line so that holes and slots can be placed on the various surfaces. While CNC beam drill lines can move the elements horizontally or vertically, rotational movement is not possible. For these circumstances, a crane or other type of machinery is commonly used to rotate the structural profiles along a single spindle drill line.

U.S. Pat. No. 3,738,143 to Orris on Jun. 12, 1973, describes a beam rotating device used in rolling mill operation where two arms are tied together and used to rotate a steel beam. One arm supports a steal beam in a horizontal position and, on rotation of 90°, the beam is transferred to the second arm from the first. While this invention does use two arms to rotate a structural profile, the arms cannot move relative to each other, the device can only rotate profiles and cannot suspend them in desired positions, and the device cannot move the profile vertically and horizontally.

U.S. Pat. No. 3,527,363 to Thatcher on Sep. 8, 1970, describes a structural profile rotating device where multiple support members at 90° angles are used to rotate the profiles from one position to another. The support members include guide rollers for loading the structural profiles and thereby rotating them about an axis. While this invention does use support members at 90° to rotate structural profiles, the support members are fixed, the device cannot move the profiles vertically and horizontally, and structural profiles cannot be loaded and unloaded onto drill lines using this device.

U.S. patent application Ser. No. 2010/0171254 to Rolle on Jul. 8, 2010, describes an apparatus for rotating structural beams during fabrication, where spaced rollers are mounted onto circular support brackets used for rotation. While this invention can rotate structural profiles, adjustable arms are not used which can move relative to each other, structural profiles cannot be loaded and unloaded onto drill lines using this device, and the device cannot move the profile vertically and horizontally.

While several devices exist for rotating structural profiles, they are time consuming and inefficient to use and are limited in capabilities. Therefore, a need exists for a machine that can rotate a structural profile quickly and easily on a single spindle drill line without unnecessary complexity. The present invention accomplishes these objectives.

SUMMARY OF THE INVENTION

The present device will provide a machine that can rotate a structural profile quickly and easily on a single spindle drill line without the use of a crane. This will allow a drill machine operator to rotate large and heavy structural profiles on a drill line and position them with the datum blocks in order to drill the different sides without the need for an overhead crane or other lifting device and without any additional labor to assist with manual flipping and positioning. This method will save manufacturers time and money, reduce operator fatigue, reduce overall complexity, and maximize safety. Furthermore, the present invention can rotate heavy structural profiles to a specific angle for saw cutting, flame cutting, fitting, welding, cleaning, grinding, priming, painting, drilling, punching, or even scribing on different surfaces.

The profile rotator comprises an arm assembly having two elongated flat members, or blades, which lay flat along the same axis, and which are controlled by hydraulic cylinders. The unique rotation member allows one of the blades to rotate vertically while the other blade remains in its horizontal position, forming an 'L' shape. The shape of the rotation member allows the arms to uniquely rotate structural profiles while in the 'L' position without the use of complex positioning electronics. When the blade is rotated, a 90 degree angle is maintained between the blades. Both the first and second blades can rotate in this manner.

A lift assembly moves the structural profiles vertically and a track assembly moves the structural profiles horizontally. A hose assembly connects all hydraulic cylinders to external power. A cover assembly protects the invention from exterior objects, dirt, metal shavings, or other harmful materials. Utilizing the lift assembly and track assembly, the arm assembly can lift, move, and rotate structural components on a drill line.

These and other objectives of the present invention will become obvious to those of ordinary skill in the art after reading the following detailed description of the preferred embodiments. It is to be understood that the foregoing general description and the following detailed description are exemplary, and are intended to provide further explanation of the invention as claimed.

DETAILED DESCRIPTION OF THE PREFERRED EMBODIMENT

Figure 1:
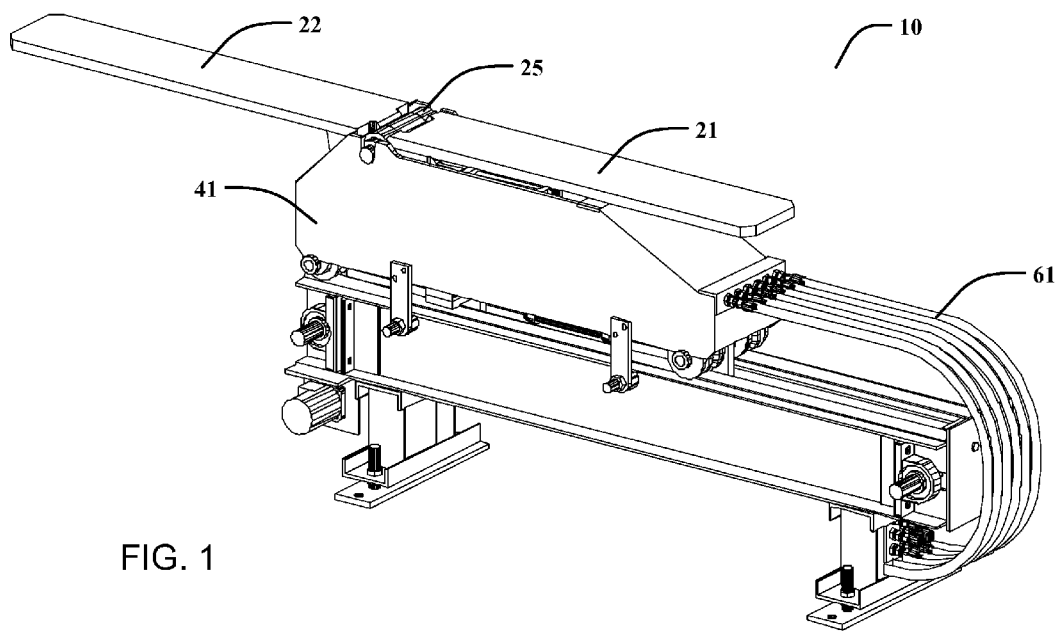
FIG. 1 is a perspective view of the invention.
Figure 2:
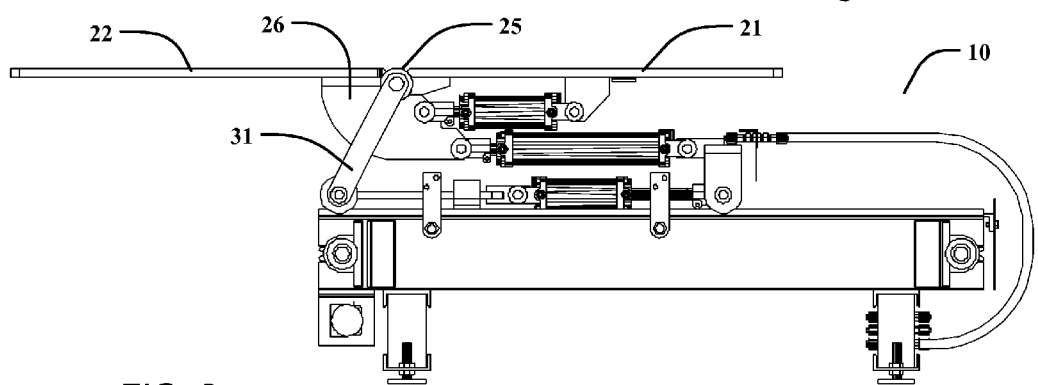
FIG. 2 is a side view of the invention exposing the arm and lift assemblies.
Figure 3:
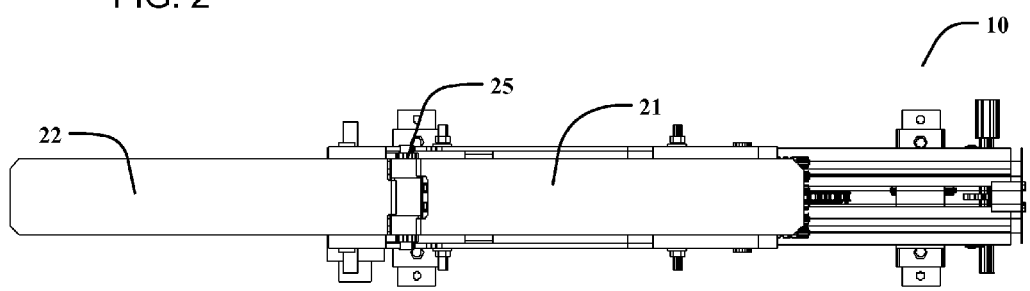
FIG. 3 is a top view of the invention.
Figure 4:
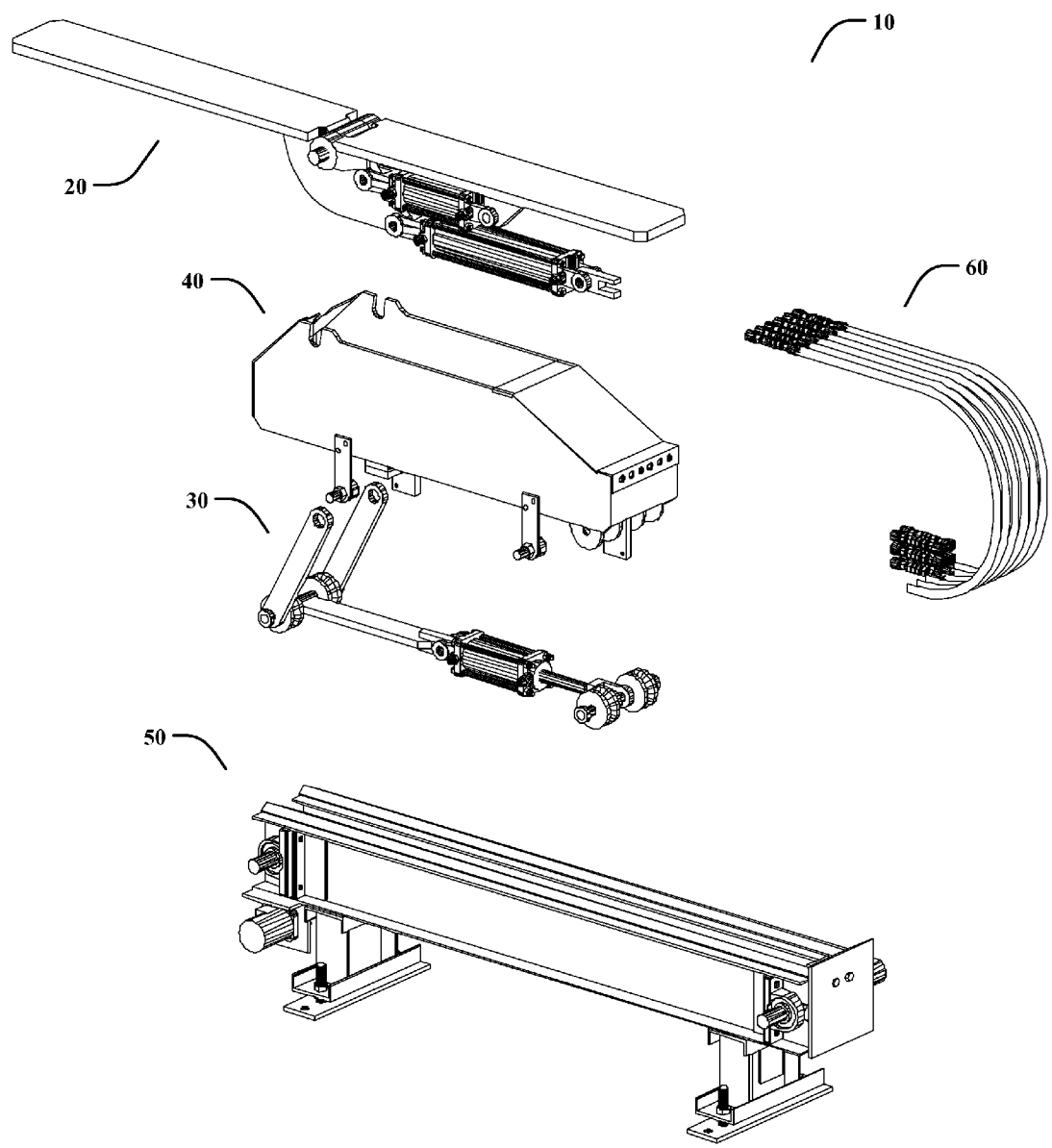
FIG. 4 is an exploded perspective view of the invention.
Figure 5:
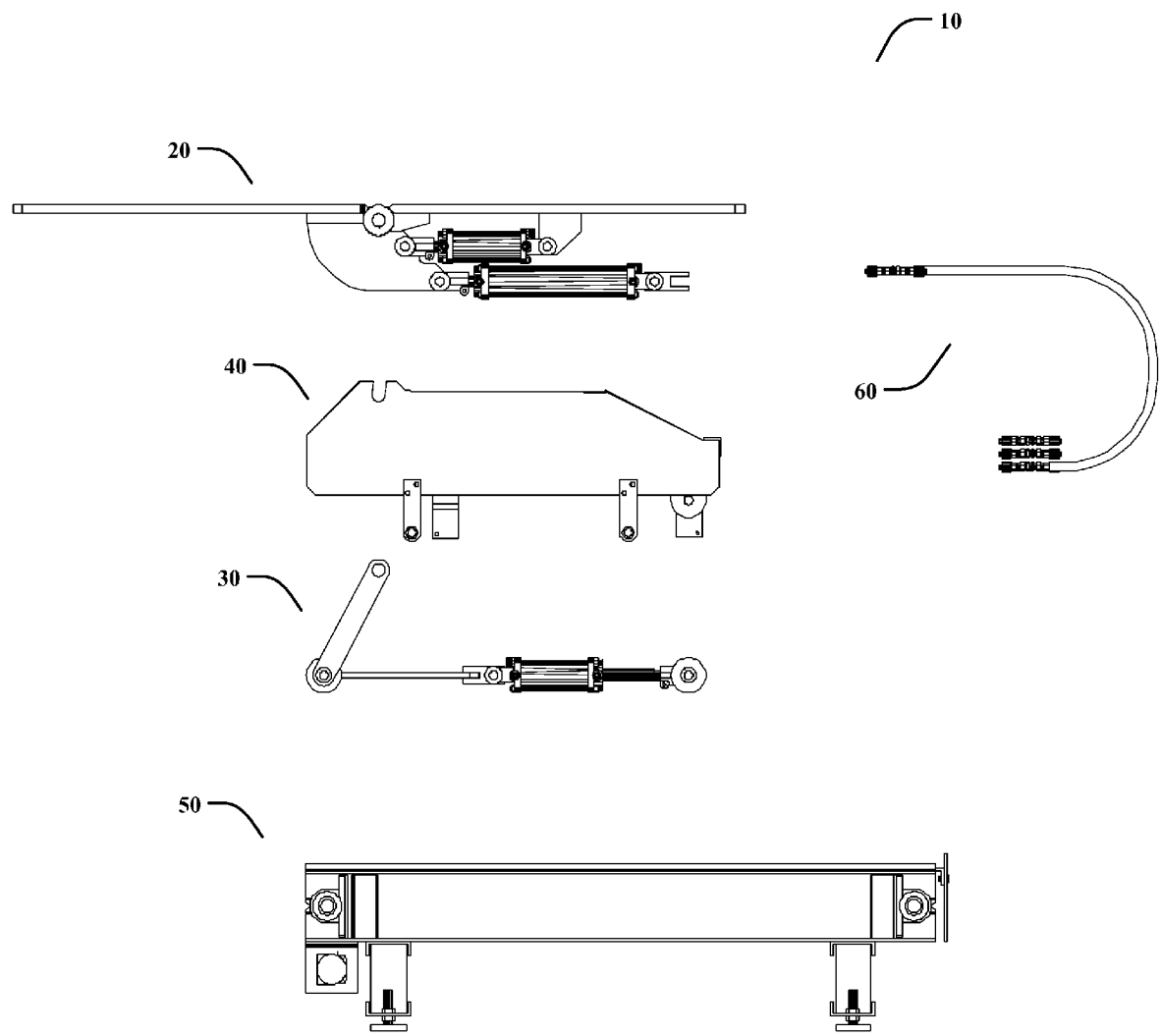
FIG. 5 is an exploded side view of the invention.

Illustrative embodiments of the invention are described below. The following explanation provides specific details for a thorough understanding of and enabling description for these embodiments. One skilled in the art will understand that the invention may be practiced without such details. In other instances, well-known structures and functions have not been shown or described in detail to avoid unnecessarily obscuring the description of the embodiments.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list.

The present invention discloses a profile rotator 10 comprising an arm assembly 20, a lift assembly 30, a cover assembly 40, a track assembly 50, and a hose assembly 60. The arm assembly 20 is used to rotate structural profiles clockwise and counterclockwise. The lift assembly 30 is adapted to move the structural profile vertically, while the track assembly 50 is adapted to move the structural profile horizontally. The hose assembly 60 connects the hydraulic lines 61 of the arm assembly 20 and lift assembly 30 to external power. The cover assembly 40 encapsulates the internal components 20, 30 to protect them from outside objects.

The arm assembly 20 comprises first and second elongated members 21, 22, or blades, each having a proximal 23 and distal 24 ends. A pivot member 25 is mutually connected to the proximal end 23 of each elongated member 21, 22. A rotation member 26 is fixedly attached to the second elongated member 22 and permits the blades 21, 22 to rotate and hold their desired positions. A first hydraulic cylinder 27 is fixedly attached to the rotation member 26 on one end and fixedly attached to the first elongated member 21 on the other. A second hydraulic cylinder 28 is fixedly attached to the rotation member 26 on one end and fixedly attached to the cover assembly 40 on the other, the cover assembly 40 acting as a stationary anchor.

The first and second hydraulic cylinders 27, 28 are adapted to rotate the first and second elongated members 21, 22 about the pivot member 25 by utilizing the shape of the rotation member 26. More specifically, the first hydraulic cylinder 27 is adapted to rotate the first elongated member 21 relative to the second elongated member 22, and the second hydraulic cylinder 28 is adapted to rotate the second elongated 22 member relative to the first elongated member 21. The hydraulic cylinders 27, 28 can create an angle in the range of 0° to 180° between the first and second elongated members 21, 22. Furthermore, the first and second hydraulic cylinders 27, 28 are adapted to rotate the first and second elongated members 21, 22 about the pivot member 25 while maintaining a rotation angle of 90 degrees.

The rotation member 26 is used to maintain the appropriate angles without a complex electronic positioning system. The rotation member 26 can generally be described as a parallelogram, where one parallel side 121 is sloped as it should be, while the opposite side 122 instead comprises a convex curve. A groove 123 is positioned on a non-sloped side 124 and is adapted to rotate the rotation member 26 about the pivot member 25. The first and second hydraulic cylinders 27, 28 are attached to the sloped side 121, with the first hydraulic cylinder 27 attached between the second hydraulic cylinder 28 and the groove 123. The rotation member 26 is also rotated about said pivot member 25 as the blades 21, 22 are rotated.

The lift assembly 30 comprises two angled support members 31 that are rotatably attached to a rolling member 32 and the pivot member 25. The third hydraulic cylinder 33 is fixedly attached to the rolling member 32 and cover assembly 40 at each end, thereby allowing the arm assembly 20 to move vertically by pushing and pulling the rolling member 32 along the track assembly 50 and altering the angle of the support members 31.

The cover assembly 40 comprises several panels 41 and encapsulates the rotation member 26, first and second hydraulic units 27, 28, and lift assembly 30. These units combine to protect the profile rotator 10 from exterior objects, dirt, metal shavings, or other harmful materials. The cover assembly 40 further comprises four alignment members 42, each alignment member 42 having a means of movably securing the arm assembly 20 along the track assembly 50. The arm assembly 20 is positioned above the cover assembly 40 and the hose assembly 60 extends from within the cover assembly 40 to the track assembly 50. Furthermore, the first hydraulic cylinder 21 and third hydraulic cylinder 33 are fixedly attached to the cover assembly 40. Lastly, the cover assembly 40 comprises two chain members 34 which are fixedly attached to the chain 51 of the track assembly 50.

The track assembly 50 comprises two movement tracks 52 which allow the lift assembly 30 to move forward and backward, providing vertical force to the arm assembly 20. The track assembly 50 further comprises two sprocket members 53 which are connected to a chain 51. The sprocket members 53 can be rotated, thereby moving the chain members 34, and consequently the lift cover 40 and arm assemblies 20, horizontally along the track assembly 50.

Figure 6A:
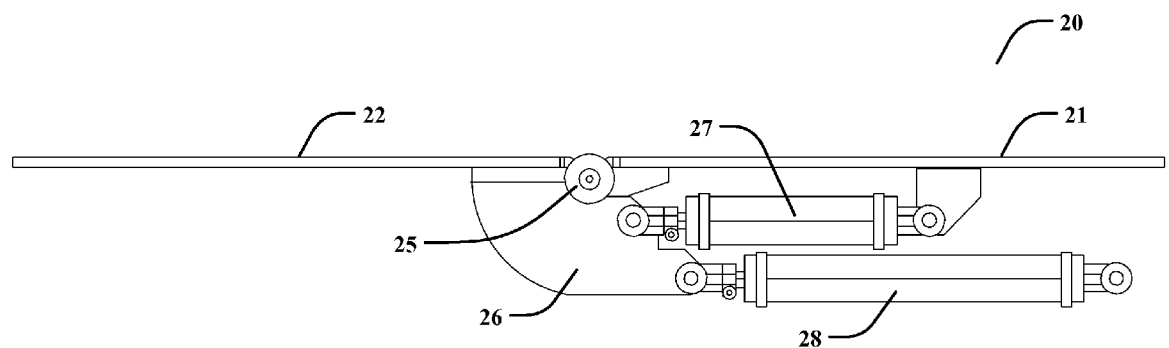
FIG. 6a is a side view of the arm assembly.
Figure 6B:
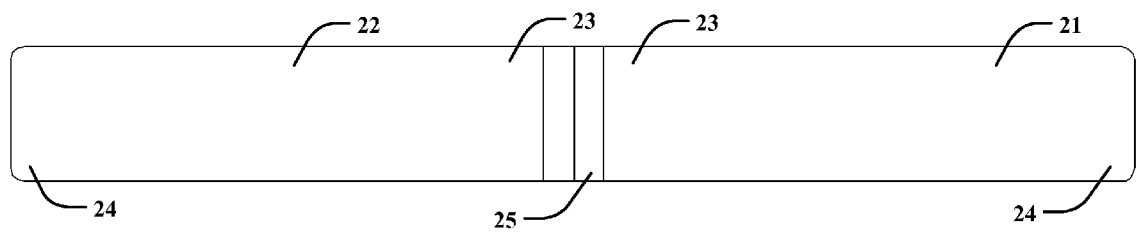
FIG. 6b is a top view of the arm assembly.
Figure 6C:
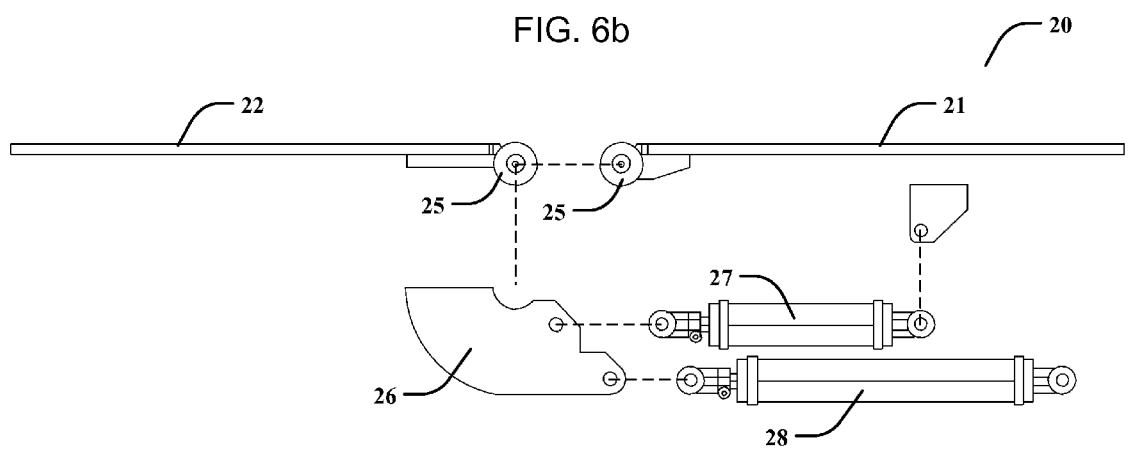
FIG. 6c is an exploded side view of the arm assembly.
Figure 7A:
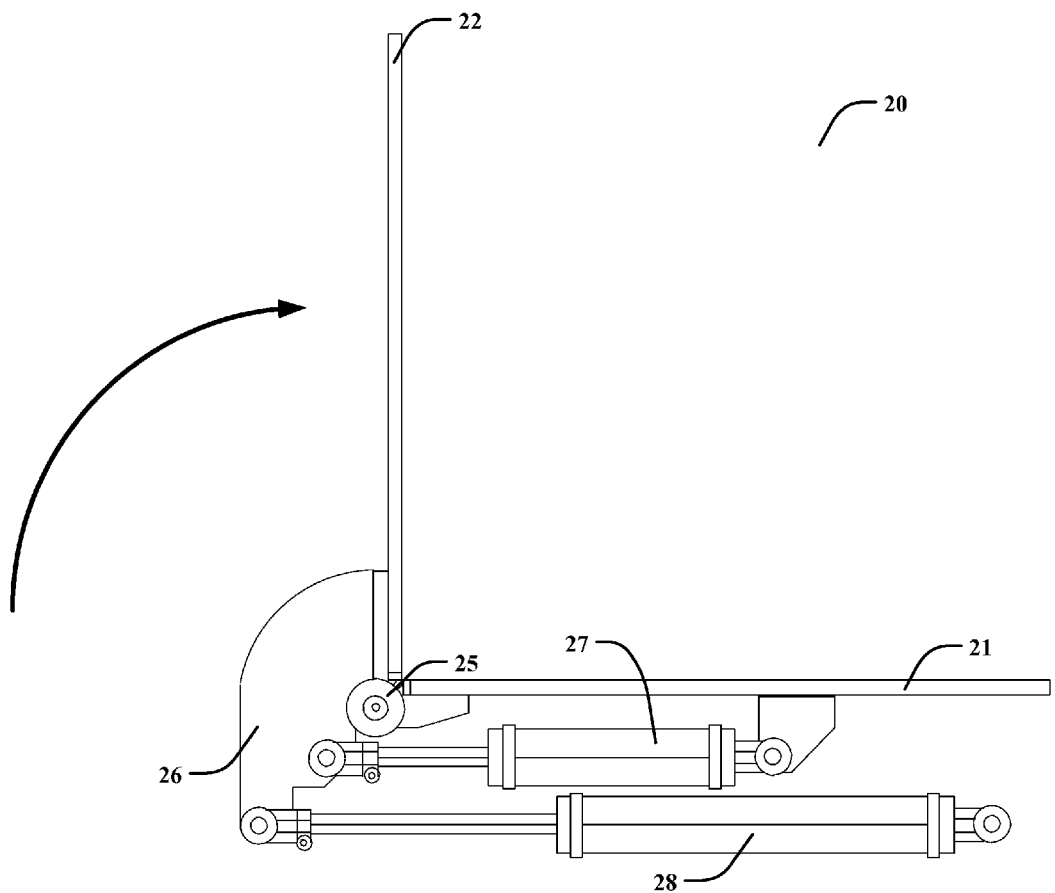
FIG. 7a is a side view of the arm assembly in one position.
Figure 7B:
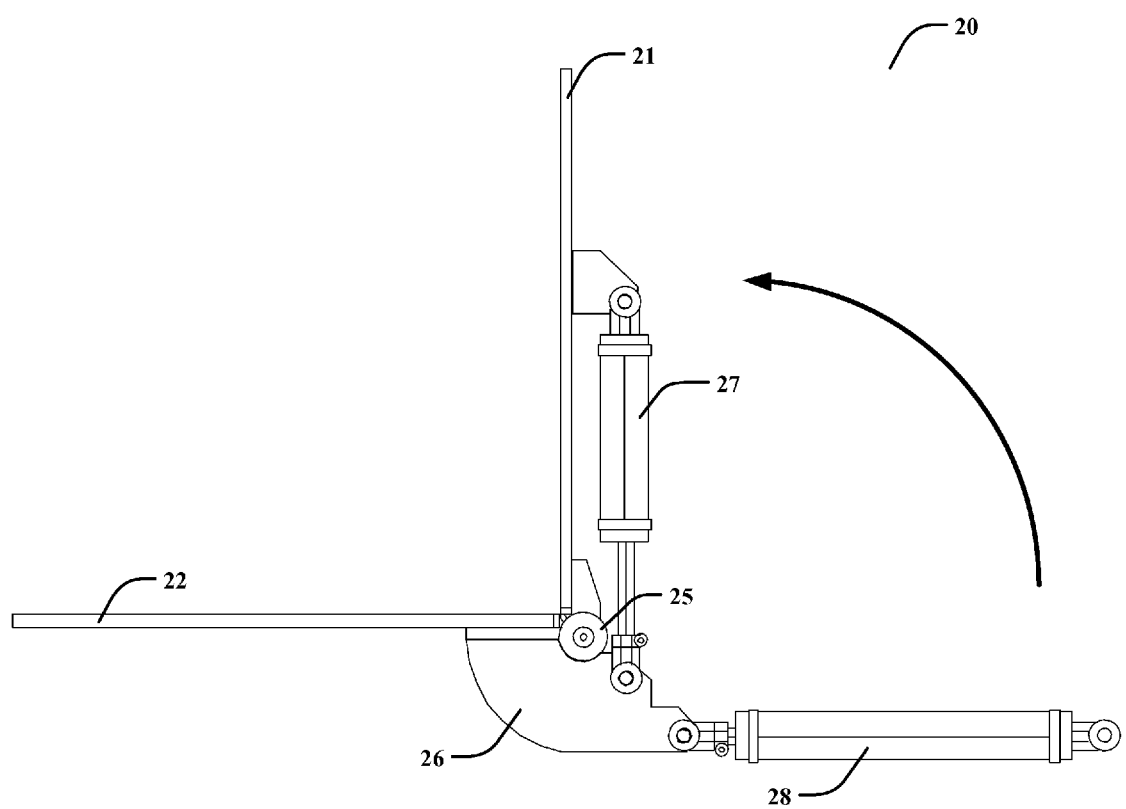
FIG. 7b is a side view of the arm assembly in an alternative position.
Figure 8:
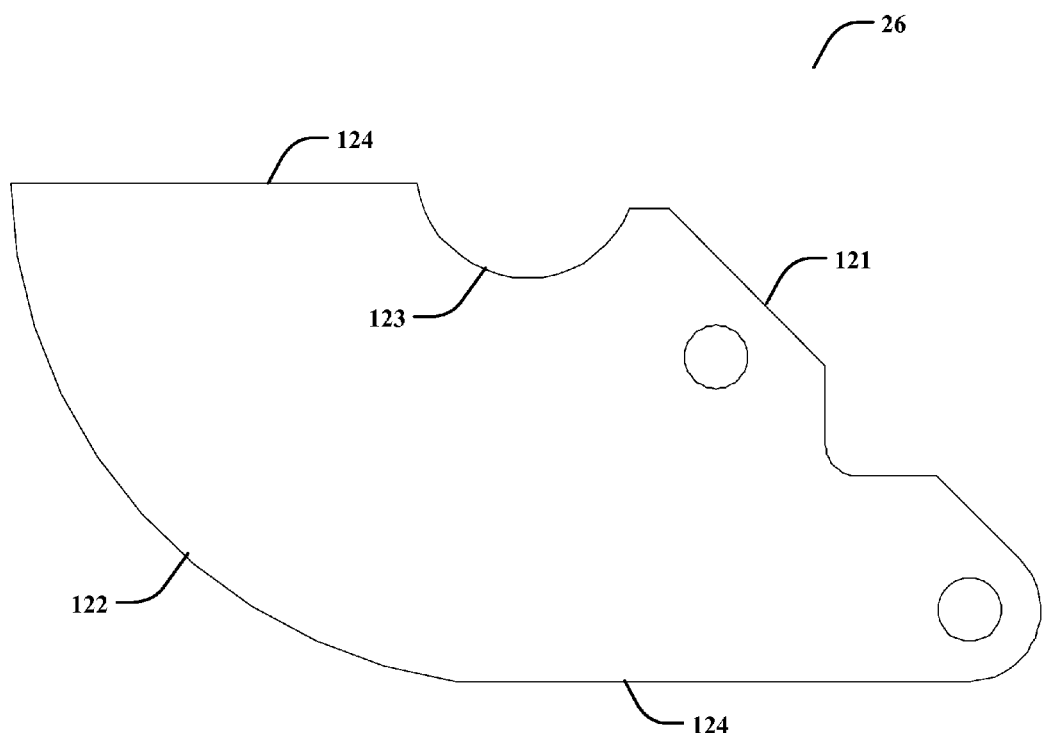
FIG. 8 is a side view of the rotation member.
Figure 9:
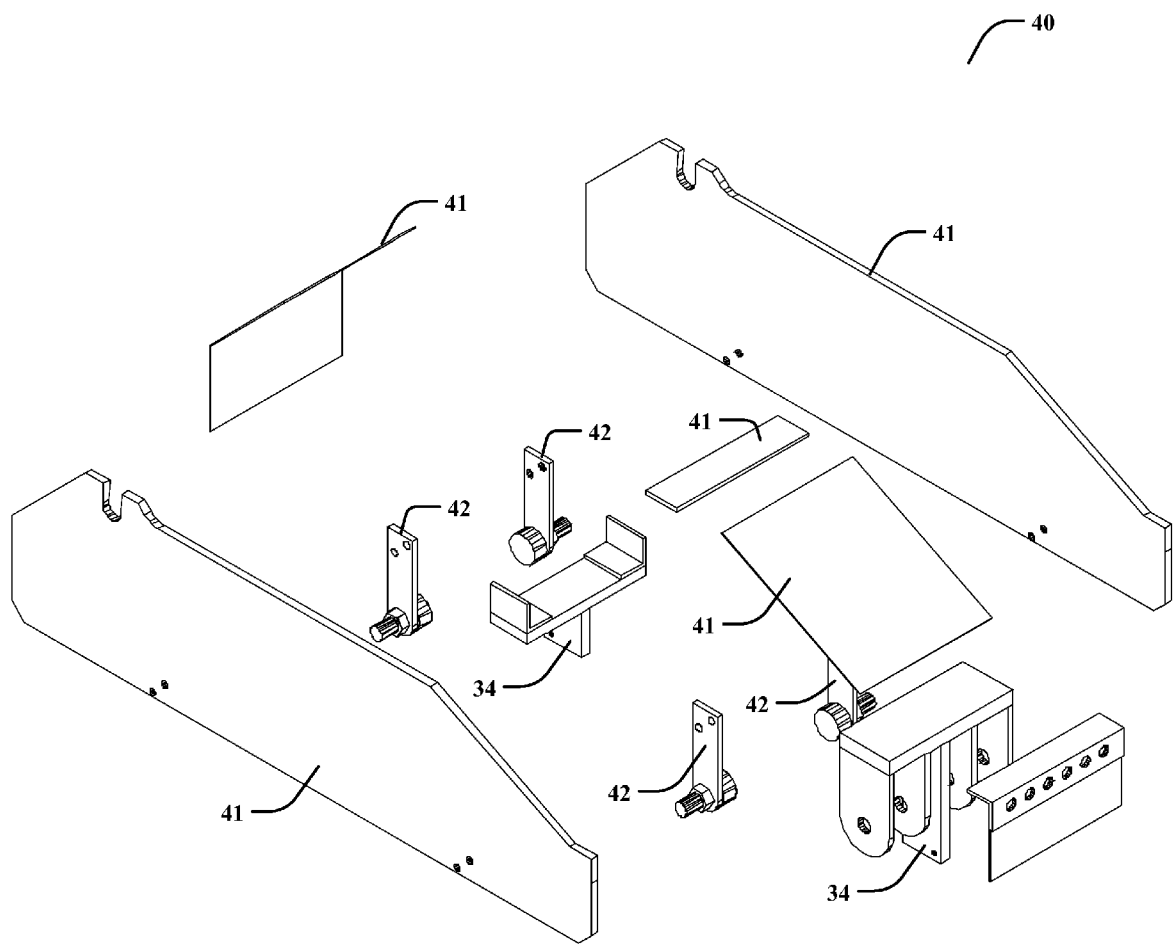
FIG. 9 is an exploded perspective view of the cover assembly.
Figure 10:
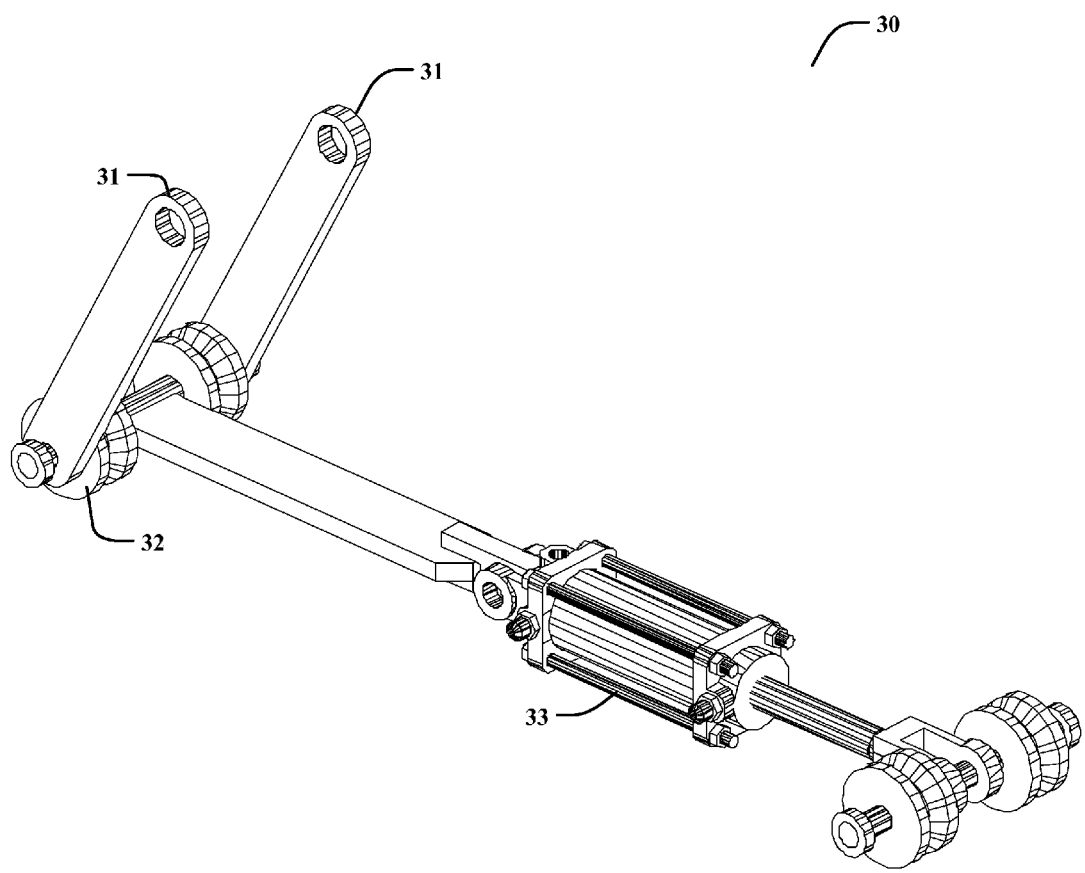
FIG. 10 is a perspective view of the lift assembly.
Figure 11:
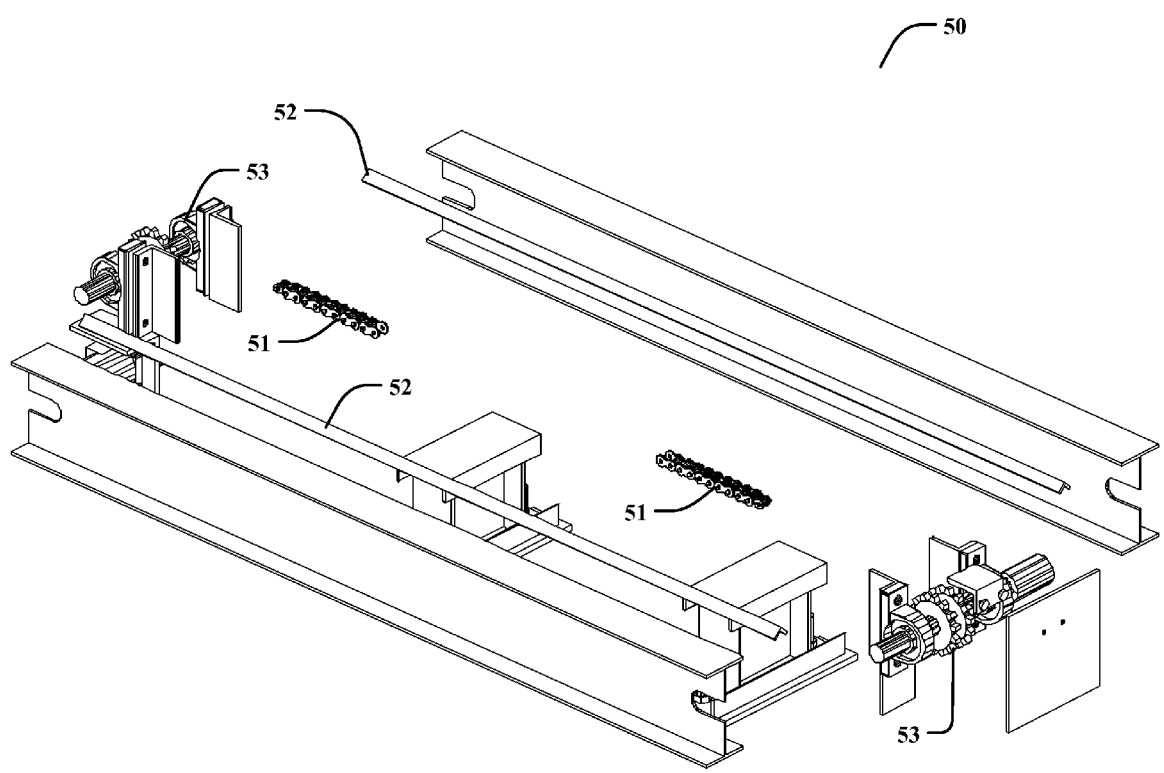
FIG. 11 is an exploded perspective view of the track assembly.

The profile rotator 10 comprises three states: open (FIG. 6a), forward (FIG. 7a), and reverse (FIG. 7b). In the open state, the first and second blades 21, 22 are positioned horizontally, and an 180° angle exists between them. In this state, the first and second structural profiles along the drill line. This position is also useful for positioning the profile rotator 10 for clockwise or counterclockwise rotation. From the open state, the profile rotator 10 can enter either the forward state or the reverse state. In addition, the carefully calculated angles and positions of the rotation member 26, pivot member 25, and hydraulic cylinders 27, 28 allow the blades 21, 22 to rotate in a compact manner.

In the forward state, the second blade 21 is rotated vertically and the first blade remains in its horizontal position. In this state, the first and second hydraulic cylinders 27, 28 are extended and positioned horizontally, the resulting shape generally described as a forward 'L.' In the reverse state, the first blade 22 is rotated vertically and the second blade remains 21 remains in its horizontal position. In this state, the first hydraulic cylinder 27 is extended and positioned vertically while the second hydraulic cylinder 28 is contracted and positioned horizontally, the resulting shape generally described as a reverse 'L.' As such, the second hydraulic cylinder 28 has a fixed horizontal orientation, while the first hydraulic cylinder 27 has a variable orientation parallel to the first blade 21. The first and second blades 21, 22 can never rotate vertically at the same time.

When in the forward state, the profile rotator 10 can enter either the open state or the reverse state. When entering the open state, the first blade 21 simply returns to its original horizontal position. When entering the reverse state, both the first and second blades 21, 22 rotate simultaneously until the first blade 21 rests horizontally and the second blade 22 rests vertically. Conversely, when in the reverse state, the profile rotator second blade 22 simply returns to its original horizontal position. When entering the reverse state, both the first and second blades 21, 22 rotate simultaneously until the second blade 22 rests horizontally and the first blade 21 rests vertically.

It is in this manner that the structural profiles are rotated. If a clockwise rotation is desired, the structural profile is positioned on the first blade 21 with its edge, or flange, adjacent to the pivot member 25 of the arm assembly 20. The profile rotator 10 will then enter the reverse state, resulting in the structural profile resting on the first blade 21, but also positioned adjacent to the second blade 22. The operator will then lift the structural profile using the lift assembly 30 and enter the forward state by rotating both blades 21, 22 simultaneously. During the rotation, the structural profile will rest on both the first blade 21 and second blade 22. Furthermore, the rotation can be suspended in any position in order to manipulate the structural profile at a desired angle. Once the profile rotator 10 enters the forward state, the operator will set the structural profile down using the lift assembly 30. If a counterclockwise rotation is desired, the above method is repeated, but from a forward state to a reverse state.

The profile rotator 10 can position itself along the drill line to ensure it is positioned properly. It can move horizontally in a forward and backward manner using the track assembly 50. Furthermore, the profile rotator 10 can position itself vertically along the drill line. This is useful for positioning itself directly under the structural profile, and profile size is 40" (1,000 cm) and the maximum anticipated weight is 30,000 lbs (14,000 kg).

Particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention.

The above detailed description of the embodiments of the invention is not intended to be exhaustive or to limit the invention to the precise form disclosed above or to the particular field of usage mentioned in this disclosure. While specific embodiments of, and examples for, the invention are described above for illustrative purposes, various equivalent modifications are possible within the scope of the invention, as those skilled in the relevant art will recognize. Also, the teachings of the invention provided herein can be applied to other systems, not necessarily the system described above. The elements and acts of the various embodiments described above can be combined to provide further embodiments.

All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

Changes can be made to the invention in light of the above "Detailed Description." While the above description details certain embodiments of the invention and describes the best mode contemplated, no matter how detailed the above appears in text, the invention can be practiced in many ways. Therefore, implementation details may vary considerably while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated.

While certain aspects of the invention are presented below in certain claim forms, the inventor contemplates the various aspects of the invention in any number of claim forms. Accordingly, the inventor reserves the right to add additional claims after filing the application to pursue such additional claim forms for other aspects of the invention.

What is claimed is:

1. An apparatus for rotating structural profiles comprising:
   first and second elongated members each having a proximal and distal end;
   a pivot member mutually connected to said proximal end of said first and second elongated members;
   a rotation member fixedly attached to said second elongated member;
   a first hydraulic cylinder fixedly attached to said rotation member and fixedly attached to said first elongated member;
   a second hydraulic cylinder fixedly attached to said rotation member; and
   a fixed orientation of said second hydraulic cylinder along the horizontal axis and a variable orientation of said first hydraulic cylinder parallel to said first elongated member;
   wherein said first and second hydraulic cylinders are adapted to rotate said first and second elongated members about said pivot member, creating an angle between said first and second elongated members; said first hydraulic cylinder adapted to rotate said first elongated member relative to said second elongated member; said second hydraulic cylinder adapted to rotate said second elongated member relative to said first elongated member; said first and second hydraulic cylinders adapted to rotate said first and second elongated members about said pivot member while maintaining a rotation angle.

2. The apparatus for rotating structural profiles of claim 1, further comprising:
   a first position wherein said first and second hydraulic cylinders are contracted and wherein said first and second elongated members are oriented horizontally;
   a second position wherein said first and second hydraulic cylinders are extended and wherein said second elongated member is oriented vertically and said first elongated member is oriented horizontally;

a third position wherein said first hydraulic cylinder is extended and said second hydraulic cylinder is contracted and wherein said second elongated member is oriented horizontally and said first elongated member is oriented vertically.

3. The apparatus for rotating structural profiles of claim 1, wherein said angle further comprises a range of 0° to 180°.

4. The apparatus for rotating structural profiles of claim 1, wherein said rotation angle is 90°.

5. The apparatus for rotating structural profiles of claim 1, wherein said elongated members further comprise blades.

6. The apparatus for rotating structural profiles of claim 1, wherein said rotation member further comprises:
   a sloped side;
   a convex curved side opposite said sloped side; and
   a groove adapted to rotate about said pivot member;
   wherein said first and second hydraulic cylinders are attached to said sloped side, said first hydraulic cylinder attached between said second hydraulic cylinder and said groove.

7. The apparatus for rotating structural profiles of claim 1, further comprising:
   a lift assembly adapted to move said first and second elongated members vertically; and
   a track assembly adapted to move said first and second elongated members horizontally;
   wherein said lift assembly comprises a third hydraulic cylinder to generate vertical force and wherein said track assembly comprises a chain drive to generate horizontal force.

8. The apparatus for rotating structural profiles of claim 7, further comprising:
   a cover assembly encapsulating said rotation member, said first and second hydraulic units, and said lift assembly.

9. A method of rotating structural steel comprising the steps of:
   a) rotating a first elongated member of a profile rotator relative to a second elongated member, forming an 'L' shape having a 90° angle, said first and second elongated members each having a proximal and distal ends, a pivot member mutually connected to said proximal end of said first and second elongated members, a rotation member fixedly attached to said second elongated member, a first hydraulic cylinder fixedly attached to said rotation member and fixedly attached to said first elongated member; a second hydraulic cylinder fixedly attached to said rotation member, and a fixed orientation of said second hydraulic cylinder along the horizontal axis and a variable orientation of said first hydraulic cylinder parallel to said first elongated member;
   b) rotating said second elongated member relative to said first elongated member, forming a reverse 'L' shape having a 90° angle; and
   c) rotating said first elongated member relative to said second elongated member, forming a flat shape having an 180o angle;
   wherein said first hydraulic cylinder is adapted to rotate said first elongated member relative to said second elongated member, said second hydraulic cylinder is adapted to rotate said second elongated member relative to said first elongated member, and said first and second hydraulic cylinders are adapted to rotate said first and second elongated members about said pivot member while maintaining a rotation angle.

10. The method of rotating structural steel of claim 9, further comprising:
    a first position wherein said first and second hydraulic cylinders are contracted and wherein said first and second elongated members are oriented horizontally;
    a second position wherein said first and second hydraulic cylinders are extended and wherein said second elongated member is oriented vertically and said first elongated member is oriented horizontally;
    a third position wherein said first hydraulic cylinder is extended and said second hydraulic cylinder is contracted and wherein said second elongated member is oriented horizontally and said first elongated member is oriented vertically.

11. The method of rotating structural steel of claim 9, wherein said rotation angle is 90°.

12. The method of rotating structural steel of claim 9, wherein said rotation member further comprises:
    a sloped side;
    a convex curved side opposite said sloped side; and
    a groove adapted to rotate about said pivot member;
    wherein said first and second hydraulic cylinders are attached to said sloped side, said first hydraulic cylinder attached between said second hydraulic cylinder and said groove.

13. The method of rotating structural steel of claim 9, further comprising:
    a lift assembly adapted to move said first and second elongated members vertically; and
    a track assembly adapted to move said first and second elongated members horizontally;
    wherein said lift assembly comprises a third hydraulic cylinder to generate vertical force and wherein said track assembly comprises a chain drive to generate horizontal force.

14. The method of rotating structural steel of claim 13, further comprising:
    a cover assembly encapsulating said rotation member, said first and second hydraulic units, and said lift assembly.

15. An apparatus for rotating structural profiles comprising:
    first and second elongated members each having a proximal and distal end;
    a pivot member mutually connected to said proximal end of said first and second elongated members;
    a rotation member fixedly attached to said second elongated member, said rotation member having a sloped side, a convex curved side opposite said sloped side, and a groove adapted to rotate about said pivot member, wherein said first and second hydraulic cylinders are attached to said sloped side, said first hydraulic cylinder attached between said second hydraulic cylinder and said groove;
    a first hydraulic cylinder fixedly attached to said rotation member and fixedly attached to said first elongated member;
    a second hydraulic cylinder fixedly attached to said rotation member;
    wherein said first and second hydraulic cylinders are adapted to rotate said first and second elongated members about said pivot member, creating an angle between said first and second elongated members between 0 and 180 degrees;
    a fixed orientation of said second hydraulic cylinder along the horizontal axis;
    a variable orientation of said first hydraulic cylinder parallel to said first elongated member;

said first hydraulic cylinder adapted to rotate said first elongated member relative to said second elongated member;

said second hydraulic cylinder adapted to rotate said second elongated member relative to said first elongated member;

said first and second hydraulic cylinders adapted to rotate said first and second elongated members about said pivot member while maintaining a rotation angle of 90 degrees;

a first position wherein said first and second hydraulic cylinders are contracted and wherein said first and second elongated members are oriented horizontally;

a second position wherein said first and second hydraulic cylinders are extended and wherein said second elongated member is oriented vertically and said first elongated member is oriented horizontally;

a third position wherein said first hydraulic cylinder is extended and said second hydraulic cylinder is contracted and wherein said second elongated member is oriented horizontally and said first elongated member is oriented vertically;

a lift assembly adapted to move said first and second elongated members vertically; and a track assembly adapted to move said first and second elongated members horizontally;

wherein said lift assembly comprises a third hydraulic cylinder to generate vertical force and wherein said track assembly comprises a chain drive to generate horizontal force; and a cover assembly encapsulating said rotation member, said first and second hydraulic units, and said lift assembly.

* * * * *